United States Patent [19]

Sopko et al.

[11] Patent Number: 5,364,172
[45] Date of Patent: Nov. 15, 1994

[54] WHEEL AND COVER ASSEMBLY WITH RADIUSED STANDOFF

[75] Inventors: Gary M. Sopko, Livonia; Gerald F. Herbert, Dearborn Heights; Syed H. Sarmast, Northville, all of Mich.

[73] Assignee: Ford Motor Company, Dearborn, Mich.

[21] Appl. No.: 136,862

[22] Filed: Oct. 18, 1993

[51] Int. Cl.⁵ .................................................. B60B 7/00
[52] U.S. Cl. ............................. 301/37.42; 301/37.31; 301/37.37
[58] Field of Search ................... 301/37.1, 37.31, 37.32, 301/37.33, 37.34, 37.35, 37.36, 37.37, 37.38, 37.42

[56] References Cited

U.S. PATENT DOCUMENTS

| | | |
|---|---|---|
| 2,212,037 | 8/1940 | Lyon . |
| 2,736,610 | 2/1956 | Waite . |
| 3,092,420 | 4/1960 | Baldwin et al. . |
| 3,265,441 | 6/1964 | Baldwin . |
| 3,333,900 | 4/1965 | Aske, Jr. . |
| 3,397,918 | 1/1967 | Aske, Jr. et al. . |
| 3,397,921 | 2/1968 | Akse, Jr. . |
| 3,436,123 | 4/1967 | Aske, Jr. et al. . |
| 3,517,968 | 10/1968 | Tully et al. . |
| 3,549,204 | 12/1970 | Spisak . |
| 3,554,536 | 1/1971 | Richter . |
| 3,671,076 | 5/1970 | Aske, Jr. . |
| 3,894,775 | 7/1975 | Christoph et al. . |
| 4,291,921 | 9/1981 | Wulf . |
| 4,603,915 | 8/1986 | Heintz ............................. 301/37.34 |
| 4,729,606 | 3/1988 | Narita et al. . |
| 4,736,988 | 4/1988 | Chamberlin et al. ........ 301/37.34 X |
| 4,819,991 | 4/1989 | Ostrowski et al. .......... 301/37.38 X |
| 4,991,909 | 2/1991 | Hamada ....................... 301/37.42 X |
| 5,031,966 | 7/1991 | Oakey . |

*Primary Examiner*—Russell D. Stormer
*Attorney, Agent, or Firm*—Daniel M. Stock; Roger L. May

[57] ABSTRACT

A wheel and cover assembly for an automotive vehicle is provided which includes standoff ribs formed on the laterally inner side of a wheel cover which have a free end that includes a curved surface, which may be formed as a radius tangent to the adjacent wheel surface, for accommodating manufacturing tolerances which result in variance in lateral spacing between the wheel cover and the wheel when the wheel cover is mechanically secured to the wheel.

14 Claims, 1 Drawing Sheet

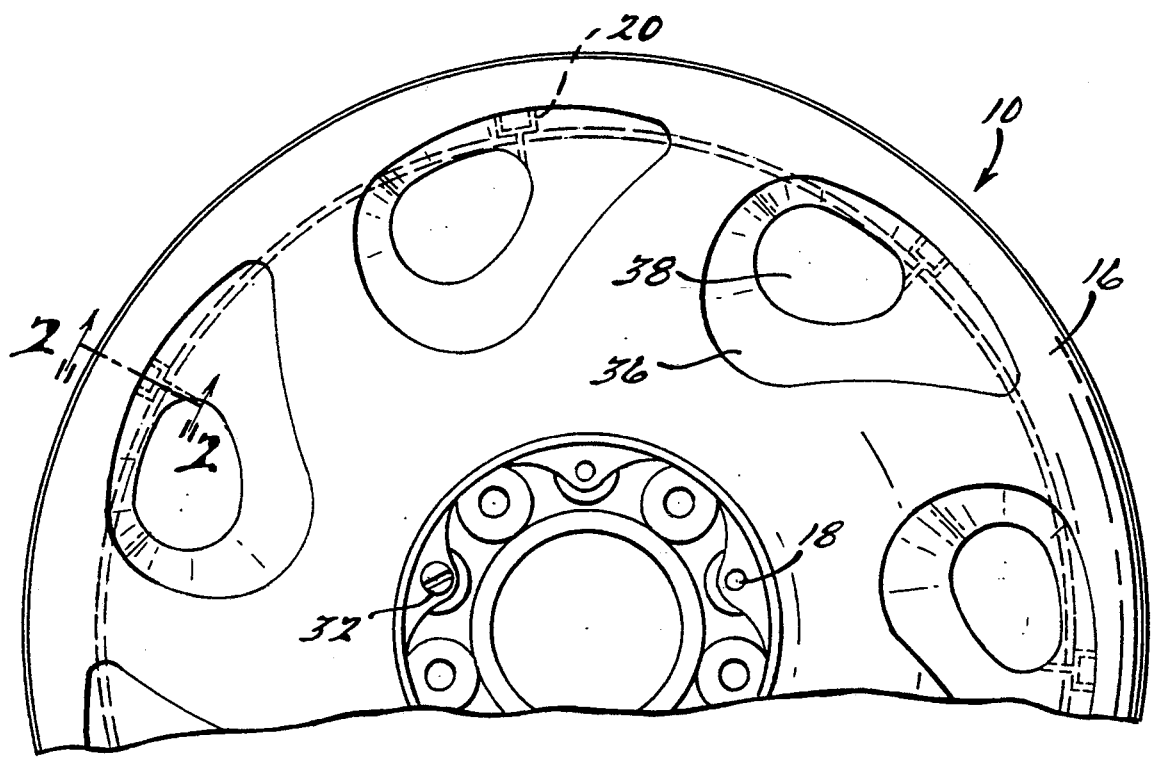
Fig. 1.
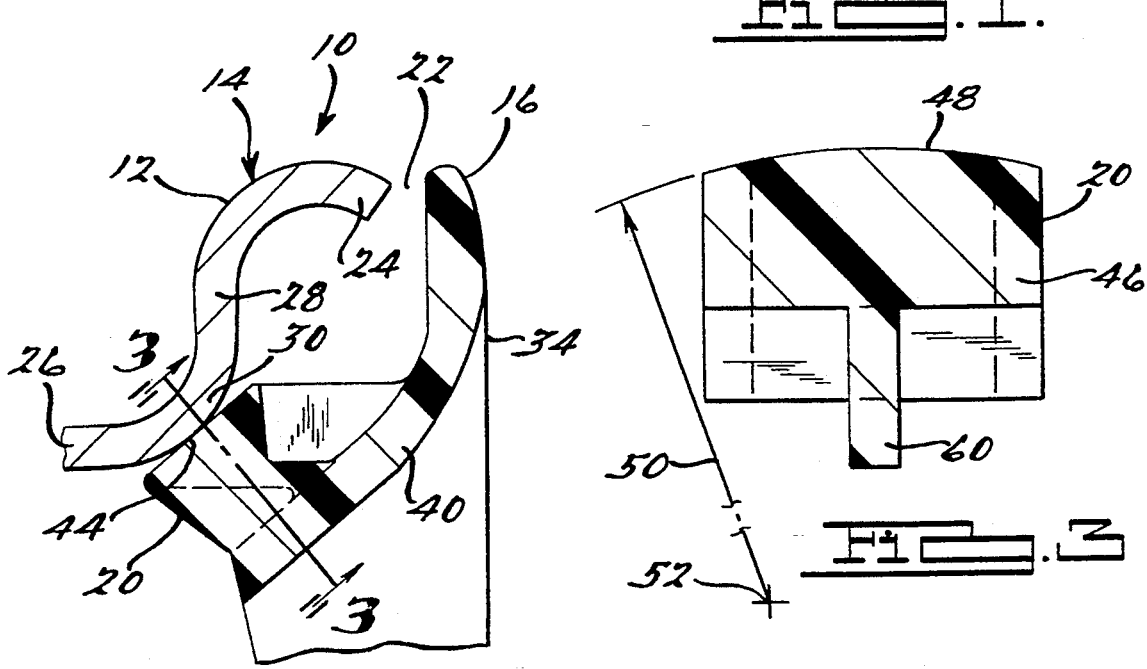
Fig. 2.
Fig. 3.
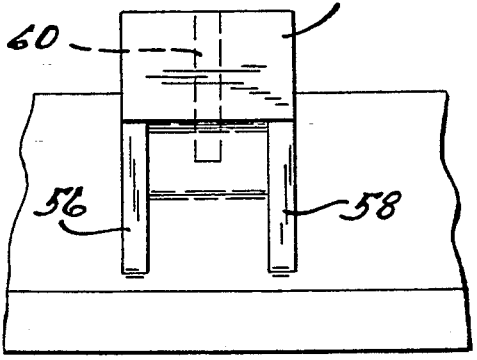
Fig. 4.

WHEEL AND COVER ASSEMBLY WITH
RADIUSED STANDOFF

BACKGROUND OF THE INVENTION

1. Field of the Invention

The present invention relates generally to automotive vehicle wheels, and more specifically to wheel covers for such wheels and mechanisms for mounting such wheel covers on the wheels.

2. Prior Art

In mounting wheel covers to automotive vehicles wheels, a wide variety of fastening mechanisms are used. Most involve the use of a fastening element, such as a clip, carried adjacent the outer periphery of the wheel cover which is mechanically engaged with a portion of the automotive vehicle wheel adjacent its outer periphery. Another mounting technique commonly used with plastic wheel covers is the fixing of the plastic wheel cover to the vehicle wheel through the use of threaded fasteners positioned proximate the hub of the wheel. In utilizing the latter mounting method, outer peripheral portions of the wheel cover are not directly mechanically attached to the wheel as in the former mounting scheme. It is, nevertheless, a goal of wheel cover mounting designer to maintain a consistent lateral gap between the inner lateral surface of the wheel cover and the outer lateral surface of the wheel. In many plastic wheel covers, standoff ribs are provided, projecting laterally inwardly from the lateral inside surface of the wheel cover to engage the wheel. U.S. Pat. No. 4,826,253 is exemplary of such designs. In the known standoff ribs, however, the standoff ribs terminate in a flat surface. Since the standoff ribs are arrayed in circumferentially spaced relationship on the inside face of the wheel cover, it has been found that realistic manufacturing tolerances prevent assuring that each of the flat surfaces of the standoff rib can be maintained coplanar with laterally outer surfaces of the wheel against which they are intended to abut.

SUMMARY OF THE INVENTION

Responsive to the deficiencies in the prior art, a wheel and cover assembly for an automotive vehicle is provided which includes a plurality of circumferentially spaced standoff ribs carried on the lateral inner surface of the wheel cover and projecting toward the vehicle road wheel which include an abutting surface at the free end of each of the ribs which is limited by a radius.

According to one preferred aspect of the present invention, the vehicle road wheel includes curved, circumferentially extending surfaces facing the wheel cover and the radiused free end of the standoff ribs abuttingly engages that surface, accommodating manufacturing tolerances by the provision of the radius which effectively varies the height of the standoff rib as it projects toward the road wheel.

BRIEF DESCRIPTION OF THE DRAWINGS

Valuable advantages and features of the present invention will be apparent to those skilled in the automotive vehicle wheel trim art upon reading the following description with reference to the accompanying drawing, in which:

FIG. 1 is a partial elevational view of a wheel and cover assembly according to the present invention;

FIG. 2 is a partial cross-sectional view taken along line 2—2 of FIG. 1;

FIG. 3 is a partial cross-sectional view taken along line 3—3 of FIG. 2; and

FIG. 4 is a rear elevational view of a portion of FIG. 1.

DESCRIPTION OF THE PREFERRED EMBODIMENT

Turning now to the drawings, and in particular to FIG. 1, a wheel and cover assembly 10 is indicated as including a road wheel 12 having an outer peripheral rim portion 14 and a cover 16. Threaded fasteners, such as bolts, indicated at 18, are used to fixedly secure the cover 16 to the wheel 12. A plurality of circumferentially spaced standoff ribs 20 (four shown) are interposed between cover 16 and the wheel 12 to control the lateral spacing between the wheel 12 and the cover 16 such as indicated at the gap 22 in FIG. 2.

As may best be seen in FIG. 2, the wheel 12 is of generally conventional design having an out-turned peripheral flange portion 24 at its peripheral edge 14, a generally laterally inwardly extending horizontal wall portion 26, and a generally radially extending annular wall portion 28 joined by a curved wall portion 30. It is to be understood that the curved wall portion 30 is formed in the wheel 12 not necessarily only in the area of the cross-section shown in FIG. 2, but may extend circumferentially about the wheel 12 in a continuous fashion. In the center of the wheel 12 are preferably carried internally threaded members 32 for receiving the bolts 18 for fixed securement of the cover 16 to the wheel 12.

The cover member 16 is preferably formed as an integrally molded plastic part having a generally flat decorative outer face 34 in which are formed a plurality of teardrop shaped depressions 36 which each terminate in a teardrop shaped aperture 38. A canted wall 40 extends from the flat surface 34 to the laterally inner surface 42 of the cover member 16 at an angle generally parallel to the tangent of the curved surface 44 of curved wall 30. The standoff ribs 20 are integrally formed with the canted wall 40 as a perpendicular projection from the wall 40 in facing abutting relationship with the curved wall 30 of wheel 12.

Turning now to FIGS. 2–4, the standoff rib 20 is formed to include an engagement pad 46 having an engagement surface 48 defined by a radius indicated at 50 formed about an axis 52 normal to the perpendicular axis of the standoff rib 20 indicated at 54 in FIG. 2. The engagement pad 46 is mounted in spaced relationship with respect to the wall 40 through a pair of laterally spaced ribs 56, 58 extending toward the radial outer portion of the cover member 16 and a central supporting rib 60 at its radially inner side. This mounting arrangement provides robust support for the radiused surface 48 and permits the curvature to accommodate variances and lateral spacing between the cover member 16 and the wheel 12 which are the necessary result of manufacturing tolerances. Owing to the flexibility of the plastic member 16, each of the circumferentially spaced standoff ribs 20 can be brought into engagement with a juxtaposed portion of the curved wall 30 at varying lateral positions across the individual radius surfaces 48 when the bolts 18 are drawn fast into nuts 32.

While only one embodiment of the wheel and cover assembly of this invention has been described, others may occur to those skilled in the automotive vehicle trim art without departing from the scope of the appended claims.

What is claimed is:

1. A wheel and cover assembly for an automotive vehicle comprising:
   a road wheel having a rotational axis and a laterally out-turned outer peripheral flange portion, a generally vertically extending annular first wall projecting radially inwardly toward the wheel rotational axis from the outer peripheral flange portion, laterally inwardly projecting second wall portion, and a circumferentially extending curved portion interconnecting the first wall portion and the second wall portion;
   a cover member overlying the road wheel in juxtaposition with the outer peripheral flange portion and the curved portion, the cover member having laterally inwardly canted walls; and
   a plurality of circumferentially spaced standoff ribs, each carried with the cover member and projecting therefrom along a perpendicular axis from the canted walls into substantially perpendicular abutting engagement with the wheel curved portion and having a free end defining a surface limited by a radius.

2. A wheel and cover assembly as defined in claim 1, wherein the standoff ribs are integrally formed with the cover member.

3. A wheel and cover assembly as defined in claim 1, wherein the radius limiting the standoff rib free end is formed about an axis normal to the standoff rib perpendicular axis.

4. A wheel and cover assembly as defined in claim 1 and further comprising a plurality of fasteners operative to fixedly secure the cover member to the road wheel at positions spaced radially inwardly with respect to the second wall portion.

5. A wheel and cover assembly as defined in claim 4 wherein the cover is fabricated from a plastic material.

6. A wheel and cover assembly as defined in claim 5, wherein the standoff ribs are integrally formed with the cover member.

7. A wheel and cover assembly as defined in claim 6, wherein the radius limiting the standoff rib free end is formed about an axis normal to the standoff rib perpendicular axis.

8. A wheel and cover assembly for an automotive vehicle comprising:
   a road wheel having an annular laterally outer surface and central, radially inner hub surfaces;
   a cover member overlying the road wheel in juxtaposition with the laterally outer annular surface, the cover member having laterally inwardly canted walls;
   a plurality of circumferentially spaced standoff ribs, each carried with the cover member and projecting therefrom along a perpendicular axis from the canted walls into substantially perpendicular abutting engagement with the wheel laterally outer surface and having a free end defining a curved surface.

9. A wheel and cover assembly as defined in claim 8, wherein the standoff ribs are integrally formed with the cover member.

10. A wheel and cover assembly as defined in claim 8, wherein the standoff rib free end is formed as a radius taken about an axis normal to the standoff rib perpendicular axis.

11. A wheel and cover assembly as defined in claim 8 and further comprising a plurality of fasteners operative to fixedly secure the cover member to the road wheel at its radially inner hub surfaces.

12. A wheel and cover assembly as defined in claim 11 wherein the cover is fabricated from a plastic material.

13. A wheel and cover assembly as defined in claim 12, wherein the standoff ribs are integrally formed with the cover member.

14. A wheel and cover assembly as defined in claim 13, wherein the radius limiting the standoff rib free end is formed about an axis normal to the standoff rib perpendicular axis.

* * * * *